US011844317B2

United States Patent
Suzuki (10) Patent No.: US 11,844,317 B2
(45) Date of Patent: Dec. 19, 2023

(54) HEDGE TRIMMER

(71) Applicant: MAKITA CORPORATION, Anjo (JP)

(72) Inventor: Masahiro Suzuki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 144 days.

(21) Appl. No.: 17/064,038

(22) Filed: Oct. 6, 2020

(65) Prior Publication Data

US 2021/0100170 A1   Apr. 8, 2021

(30) Foreign Application Priority Data

Oct. 7, 2019   (JP) .................................. 2019-184836
Oct. 7, 2019   (JP) .................................. 2019-184837

(51) Int. Cl.
   *A01G 3/053*   (2006.01)
   *B25F 5/02*    (2006.01)
   *B25F 5/00*    (2006.01)

(52) U.S. Cl.
   CPC .............. *A01G 3/053* (2013.01); *B25F 5/006* (2013.01); *B25F 5/026* (2013.01)

(58) Field of Classification Search
   CPC ...... A01G 3/047; A01G 3/0475; A01G 3/053; B25F 5/006; B25F 5/026
   See application file for complete search history.

(56) References Cited

U.S. PATENT DOCUMENTS

| 2,284,196 | A | * | 5/1942 | Gramps | ................. | A01G 3/047 |
| | | | | | | 30/198 |
| 3,652,074 | A | * | 3/1972 | Frederickson | .......... | B27B 17/00 |
| | | | | | | 267/140 |
| 3,897,630 | A | * | 8/1975 | Glover | ................... | A01G 3/053 |
| | | | | | | 56/297 |
| 4,441,255 | A | * | 4/1984 | Hoffman | ................ | B23D 51/10 |
| | | | | | | 30/392 |

(Continued)

FOREIGN PATENT DOCUMENTS

| CN | 101720632 A | 6/2010 |
| CN | 202565799 U | 12/2012 |

(Continued)

OTHER PUBLICATIONS

Communication dated Jan. 19, 2023, issued in Chinese Application No. 202011051655.3.

(Continued)

*Primary Examiner* — Sean M Michalski
*Assistant Examiner* — Richard D Crosby, Jr.
(74) *Attorney, Agent, or Firm* — Sughrue Mion, PLLC (57) ABSTRACT

A hedge trimmer may include a body housing; a blade extending forward from a front portion of the body housing; a prime mover housed in the body housing and configured to drive the blade; a front handle disposed forward of the body housing and including a grip support and a front grip, wherein the blade is attached to the grip support and the front grip is connected to the grip support; and a rear handle (Continued)

connected to a rear portion of the body housing and including a rear grip. A first vibration isolator may be disposed between the grip support and the blade.

12 Claims, 7 Drawing Sheets (56) References Cited

U.S. PATENT DOCUMENTS

| | | | | |
|---|---|---|---|---|
| 4,555,849 | A * | 12/1985 | Ando | B27B 9/00 |
| | | | | 320/112 |
| 4,638,562 | A * | 1/1987 | Drake | A01G 3/053 |
| | | | | 30/340 |
| 4,827,616 | A * | 5/1989 | Sistare | A01G 3/053 |
| | | | | 30/277.4 |
| 4,979,303 | A * | 12/1990 | Han | B26B 19/06 |
| | | | | 30/216 |
| 6,415,515 | B1 * | 7/2002 | Wheeler | F16B 5/025 |
| | | | | 30/208 |
| 6,446,421 | B1 * | 9/2002 | Kramer | F02B 63/02 |
| | | | | 30/381 |
| 6,598,299 | B2 * | 7/2003 | Stark | A01G 3/053 |
| | | | | 30/220 |
| 6,973,726 | B2 * | 12/2005 | Kramer | A01G 3/053 |
| | | | | 16/110.1 |
| 6,994,068 | B2 * | 2/2006 | Menzel | F02B 63/02 |
| | | | | 123/192.1 |
| 6,996,909 | B1 * | 2/2006 | Buck | H01M 50/543 |
| | | | | 30/DIG. 1 |
| 7,757,405 | B2 * | 7/2010 | Peterson | A01G 3/053 |
| | | | | 30/220 |
| 7,905,261 | B2 * | 3/2011 | Hamisch | B27B 17/00 |
| | | | | 123/90.38 |
| 8,397,389 | B2 * | 3/2013 | Geromiller | A01G 3/053 |
| | | | | 30/220 |
| 8,813,369 | B2 * | 8/2014 | Kratzig | A01G 3/053 |
| | | | | 30/211 |
| 8,918,998 | B2 * | 12/2014 | Heinzelmann | A01G 3/053 |
| | | | | 30/208 |
| 9,357,711 | B2 * | 6/2016 | Kato | A01G 3/053 |
| 9,642,313 | B2 * | 5/2017 | Heinzelmann | A01G 3/04 |
| 10,136,584 | B1 * | 11/2018 | Cours | F16H 1/30 |
| 10,321,636 | B2 * | 6/2019 | Peterson | A01G 3/053 |
| 10,721,862 | B2 * | 7/2020 | Bich | A01D 34/14 |
| 11,272,671 | B2 * | 3/2022 | Shimizu | A01D 34/135 |
| 2003/0111315 | A1 * | 6/2003 | Kramer | F16D 43/14 |
| | | | | 192/105 BA |
| 2007/0245575 | A1 * | 10/2007 | Rosskamp | A01G 3/053 |
| | | | | 30/392 |
| 2009/0241350 | A1 * | 10/2009 | Lau | B27B 17/0008 |
| | | | | 30/208 |
| 2010/0095533 | A1 * | 4/2010 | Takahashi | B26B 15/00 |
| | | | | 30/228 |
| 2010/0146796 | A1 * | 6/2010 | Geromiller | A01G 3/053 |
| | | | | 30/223 |
| 2010/0154226 | A1 * | 6/2010 | Heinzelmann | A01G 3/053 |
| | | | | 30/216 |
| 2010/0218386 | A1 * | 9/2010 | Ro | A01G 3/053 |
| | | | | 30/277.4 |
| 2010/0218967 | A1 * | 9/2010 | Ro kamp | A01G 3/053 |
| | | | | 173/217 |
| 2011/0162219 | A1 * | 7/2011 | Okouchi | B27B 17/00 |
| | | | | 173/217 |
| 2011/0179651 | A1 * | 7/2011 | Hittmann | A01G 3/053 |
| | | | | 30/216 |
| 2011/0203119 | A1 | 8/2011 | Rosskamp | |
| 2012/0036722 | A1 * | 2/2012 | Hittmann | A01G 3/053 |
| | | | | 30/216 |
| 2012/0073144 | A1 * | 3/2012 | Tamura | B25F 5/006 |
| | | | | 173/162.2 |
| 2012/0151778 | A1 * | 6/2012 | Svennung | A01G 3/053 |
| | | | | 30/223 |
| 2012/0317821 | A1 * | 12/2012 | Tsuchiya | A01G 3/053 |
| | | | | 30/196 |
| 2012/0324743 | A1 * | 12/2012 | Bergquist | B25F 5/02 |
| | | | | 30/276 |
| 2013/0074347 | A1 * | 3/2013 | Abe | B25F 5/02 |
| | | | | 30/273 |
| 2013/0097878 | A1 * | 4/2013 | Naito | B23D 47/12 |
| | | | | 30/340 |
| 2014/0047719 | A1 * | 2/2014 | Shimizu | A01G 3/053 |
| | | | | 30/216 |
| 2014/0215833 | A1 * | 8/2014 | Heinzelmann | A01G 3/053 |
| | | | | 30/216 |
| 2015/0223401 | A1 * | 8/2015 | Schiedt | A01G 3/053 |
| | | | | 30/277.4 |
| 2016/0113209 | A1 * | 4/2016 | Sergyeyenko | A01G 3/053 |
| | | | | 30/216 |
| 2016/0345714 | A1 * | 12/2016 | Yamaoka | B25F 5/02 |
| 2017/0071134 | A1 * | 3/2017 | Li | B25F 5/02 |
| 2017/0127619 | A1 | 5/2017 | Rosskamp | |

FOREIGN PATENT DOCUMENTS

| | | |
|---|---|---|
| CN | 203261830 U | 11/2013 |
| CN | 203492442 U | 3/2014 |
| CN | 206481651 U | 9/2017 |
| CN | 209403098 U | 9/2019 |
| JP | 2001-016980 A | 1/2001 |
| JP | 2007-275063 A | 10/2007 |
| JP | 2008-11793 A | 1/2008 |
| JP | 2010-115190 A | 5/2010 |
| JP | 2010-201612 A | 9/2010 |
| JP | 2010-274384 A | 12/2010 |
| JP | 2012-70679 A | 4/2012 |
| JP | 2014-18183 A | 2/2014 |
| JP | 2014-36640 A | 2/2014 |
| JP | 2014-147354 A | 8/2014 |
| JP | 2017-56537 A | 3/2017 |
| WO | 2011/113445 A1 | 9/2011 |
| WO | 2014/119174 A1 | 8/2014 |

OTHER PUBLICATIONS

Communication dated Feb. 14, 2023, issued in Japanese Application No. 2019-184836.
Communication dated Mar. 7, 2023, issued in Japanese Application No. 2019-184837.
Chinese Office Action dated Aug. 1, 2023 in Chinese Application No. 202011051655.3.

* cited by examiner

HEDGE TRIMMER

CROSS-REFERENCE TO RELATED APPLICATIONS

This application claims priority to Japanese Patent Application No. 2019-184836 filed on Oct. 7, 2019, and Japanese Patent Application No. 2019-184837 filed on Oct. 7, 2019, the contents of which are hereby incorporated by reference into the present application.

TECHNICAL FIELD

The present disclosure relates to a hedge trimmer.

BACKGROUND ART

Japanese Patent Application Publication No. 2001-16980 describes a hedge trimmer including a body housing; a blade extending forward from a front portion of the body housing; a prime mover housed in the body housing and configured to drive the blade; a front handle disposed forward of the body housing and including a grip support to which the blade is attached and a front grip connected to the grip support; and a rear handle including a rear grip connected to a rear portion of the body housing. In this hedge trimmer, the grip support is configured of a left support to which the blade is attached and a right support to which the front grip is connected. A vibration isolator is disposed between the left support and the right support.

SUMMARY

In the hedge trimmer of Japanese Patent Application Publication No. 2001-16980, the vibration isolator disposed between the left support and the right support reduces transmission of vibrations caused by the blade being driven from the left support to the right support, that is, to the front grip. The vibrations, however, could be transmitted from the left support to the right support via a junction between the left support and the right support, for example. If the vibrations are transmitted from the left support to the right support, the vibrations are transmitted also to the front grip connected to the right support.

The disclosure herein provides a hedge trimmer that enables further reduction in vibrations transmitted from a blade to a front grip.

A hedge trimmer disclosed herein may comprise: a body housing; a blade extending forward from a front portion of the body housing; a prime mover housed in the body housing and configured to drive the blade; a front handle disposed forward of the body housing and comprising a grip support and a front grip, wherein the blade is attached to the grip support and the front grip is connected to the grip support; and a rear handle connected to a rear portion of the body housing and comprising a rear grip. A first vibration isolator may be disposed between the grip support and the blade.

In the above-described configuration, the first vibration isolator, which is disposed between the grip support and the blade, absorbs vibrations caused by the blade being driven. This reduces transmission of the vibrations caused by the blade being driven to the grip support. Thus, vibrations transmitted from the grip support to the front grip can further be reduced.

DETAILED DESCRIPTION

A hedge trimmer disclosed herein may comprise: a body housing; a blade extending forward from a front portion of the body housing; a prime mover housed in the body housing and configured to drive the blade; a front handle disposed forward of the body housing and comprising a grip support and a front grip, wherein the blade is attached to the grip support and the front grip is connected to the grip support; and a rear handle connected to a rear portion of the body housing and comprising a rear grip. A first vibration isolator may be disposed between the grip support and the blade.

In one or more embodiments, the grip support may be connected to the front portion of the body housing. A second vibration isolator may be disposed between the body housing and the grip support.

The blade is attached to the body housing, and hence vibrations caused by the blade being driven are also transmitted to the body housing. The vibrations transmitted from the blade to the body housing are then transmitted to the grip support connected to the front portion of the body housing. In the above-described configuration, the second vibration isolator, which is disposed between the body housing and the grip support, reduces transmission of the vibrations, which were transmitted from the blade to the body housing, to the grip support.

In one or more embodiments, the front grip and the grip support may be integrated with each other.

The above-described configuration facilitates formation of the front handle, as compared with a configuration where the front grip and the grip support are separate parts. Moreover, the above-described configuration reduces the number of components of the hedge trimmer.

In one or more embodiments, the prime mover may be a motor configured to be driven by electric power.

If the prime mover is an engine, vibrations caused by the engine being driven are significant. Thus, vibrations caused by the blade being driven do not contribute much to vibrations transmitted to the front grip. On the other hand, if the prime mover is a motor, vibrations caused by the motor being driven are not significant. Thus, vibrations caused by the blade greatly contribute to vibrations transmitted to the front grip. The above-described configuration reduces transmission of the vibrations caused by the blade being driven to the front grip.

Another hedge trimmer disclosed herein may comprise: a body housing; a blade extending forward from a front portion of the body housing; a motor housed in the body housing and configured to drive the blade; a front grip connected to the body housing; a rear grip connected to the body housing and disposed rearward of the front grip; and a battery detachably attached to the body housing by sliding the battery with respect to the body housing when the hedge trimmer is placed on a placement surface. A sliding direction of the battery with respect to the body housing may form 45 degrees or more upward to a longitudinal axis of the blade when the hedge trimmer is placed on the placement surface.

In the above-described hedge trimmer, the battery can be detached and attached when the hedge trimmer is placed on the placement plane such as the ground. This facilitates detachment and attachment of the battery because a user does not need to support the hedge trimmer with his/her hand. The above-described configuration enables the user to detach and attach the battery from above. Thus, the above-described configuration facilitates detachment and attachment of the battery as compared with a configuration where the battery is detached and attached from a lateral side. Therefore, the user can easily detach and attach the battery.

In one or more embodiments, the sliding direction may be substantially orthogonal to the longitudinal axis of the blade.

The above-described configuration enables the user to detach and attach the battery from immediately above the body housing. This facilitates detachment and attachment of the battery. Therefore, the user can more easily detach and attach the battery.

In one or more embodiments, the battery may be attached between the body housing and the rear grip. A space may be present between the rear grip and the battery.

The above-described configuration enables the user to slip his/her finger(s) into the space between the rear grip and the battery to push upward a bottom surface of the battery attached to the body housing. Therefore, the user can easily detach the battery from the body housing.

In one or more embodiments, a center of gravity of the hedge trimmer with the battery attached to the body housing may be positioned rearward of the front grip and forward of the rear grip.

For example, the user grips the front grip with his/her right hand and grips the rear grip with his/her left hand when operating the hedge trimmer. If the center of gravity of the hedge trimmer is positioned forward of the front grip, a front portion of the hedge trimmer would likely be tilted downward while the user is gripping the hedge trimmer, which results in poor operability. The above-described configuration enables the user to easily control tilting of the hedge trimmer in a front-rear direction while he/she is gripping the hedge trimmer. Therefore, operability of the hedge trimmer can be improved.

EMBODIMENT

Figure 1:
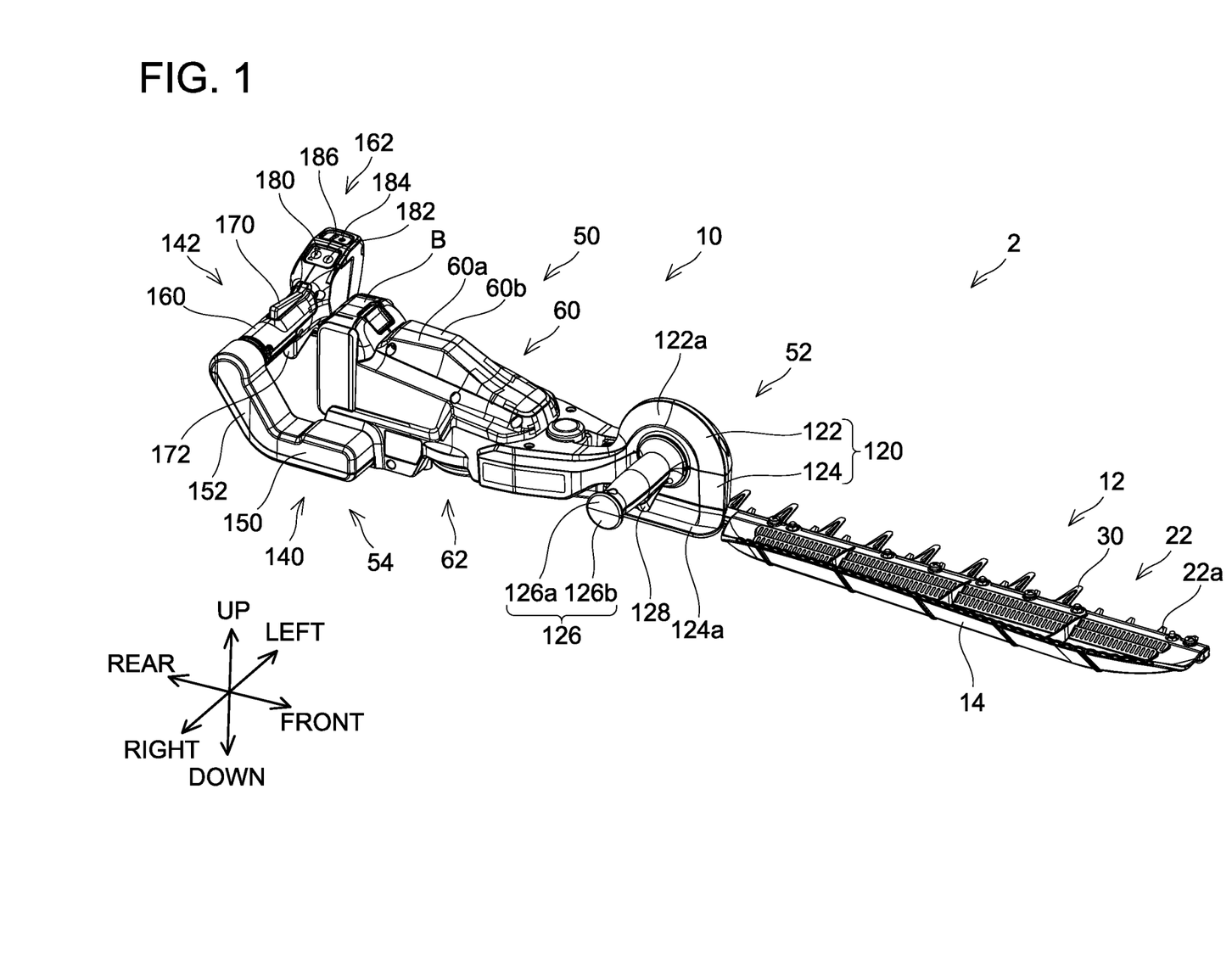
FIG. 1 is a perspective view of a hedge trimmer 2 according to an embodiment when viewed from upper-right-front side.

With reference to the drawings, a hedge trimmer 2 according to an embodiment will be described. The hedge trimmer 2 is a power tool for gardening and is used for trimming hedges, for example. As shown in FIG. 1, the hedge trimmer 2 includes a body 10, a blade unit 12 attached to the body 10, and a chip receiver 14 attached to the blade unit 12. The chip receiver 14 is tray-shaped member and is configured to receive leaves and branches cut by the blade unit 12. The chip receiver 14 is constituted of a resin material, although not limited so. In the following description, a longitudinal direction of the blade unit 12 will be termed a front-rear direction, an up-down direction in FIG. 6 will be termed an up-down direction, and a direction orthogonal to the front-rear direction and the up-down direction will be termed a right-left direction.

(Configuration of Blade Unit 12)

Figure 3:
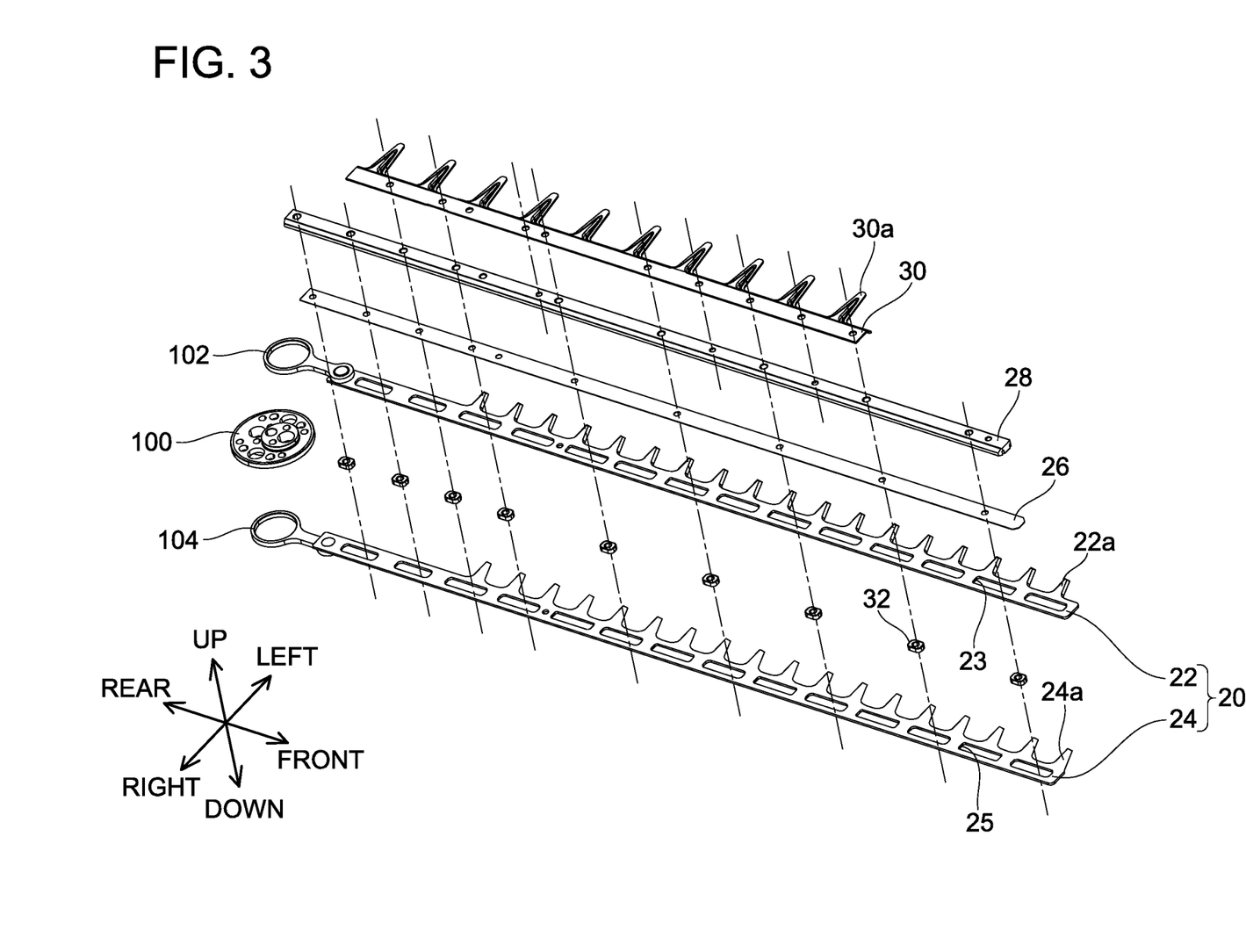
FIG. 3 is an exploded view of a blade unit 12 according to the embodiment.
Figure 5:
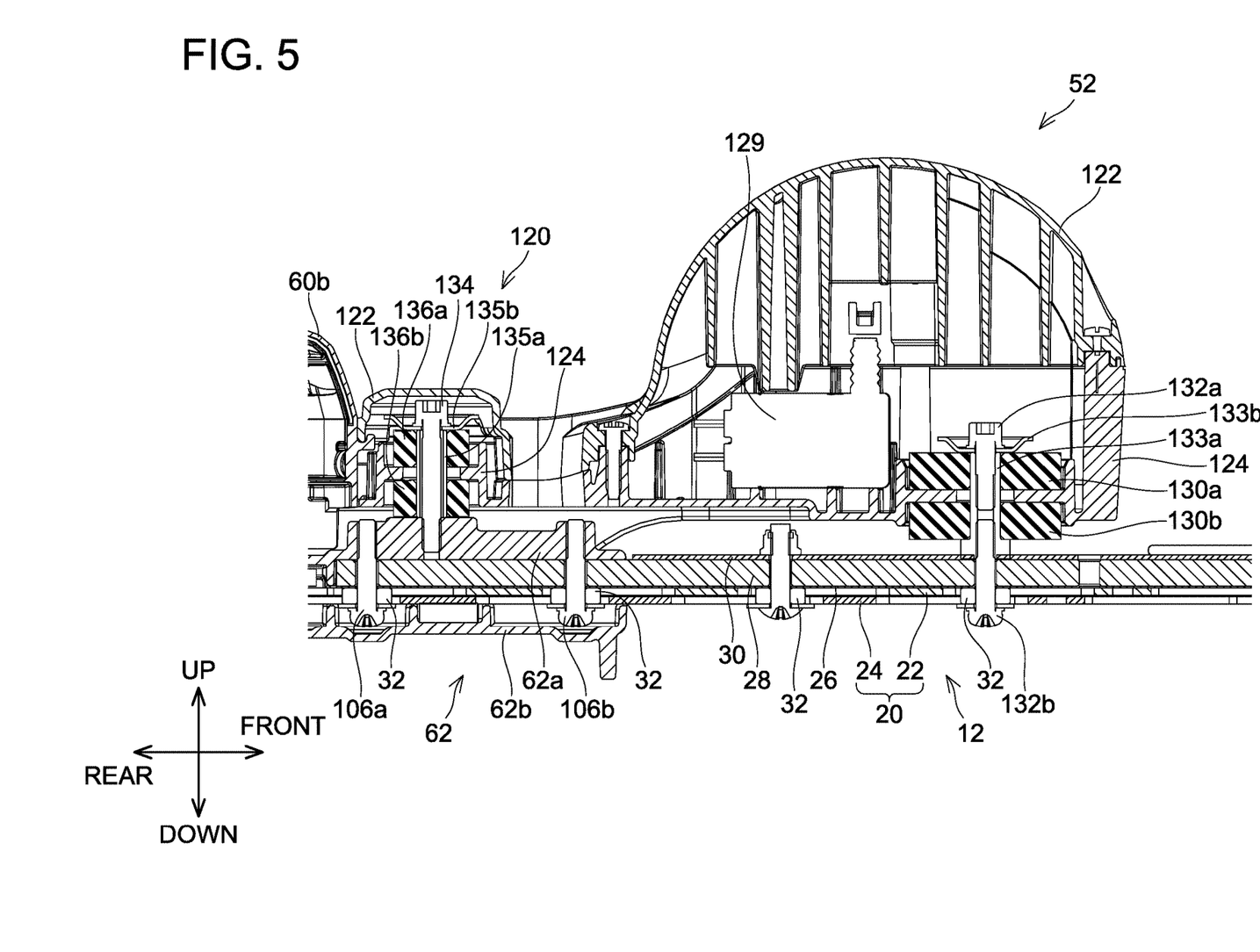
FIG. 5 is a cross-sectional view of a front handle 52 according to the embodiment.

The blade unit 12 linearly extends forward from the body 10. As shown in FIG. 3, the blade unit 12 includes a pair of blades 20 including an upper blade 22 and a lower blade 24, a guide plate 26, a guide bar 28, and a guard 30. As shown in FIG. 5, the guide plate 26 and the guide bar 28 are fixed to a crank housing 62 of the body 10, which will be described later. The pair of blades 20 is supported by the guide bar 28. The guide plate 26 is disposed between the guide bar 28 and the upper blade 22.

A plurality of blade edges 22a is disposed on the upper blade 22 along the front-rear direction. The plurality of blade edges 22a is disposed only on a left side of the upper blade 22. In other words, the upper blade 22 is a single-edged blade. A plurality of elongated holes 23 is in the upper blade 22. The elongated holes 23 are arranged along the front-rear direction, and each elongated hole 23 has its longitudinal direction along the front-rear direction. Moreover, each elongated hole 23 penetrates the upper blade 22 in the up-down direction. A guide member 32 is inserted in each elongated hole 23 to guide reciprocation of the upper blade 22. A length of the guide members 32 in the right-left direction is substantially equal to a length of the elongated holes 23 in the right-left direction. An upper connecting rod 102 is coupled to a rear portion of the upper blade 22. The upper connecting rod 102 is connected to a crank cam 100. The crank cam 100 and the upper connecting rod 102 will be described later in detail.

A plurality of blade edges 24a is disposed on the lower blade 24 along the front-rear direction. The plurality of blade edges 24a is disposed only on a left side of the lower blade 24. In other words, the lower blade 24 is also a single-edged blade. A plurality of elongated holes 25 is in the lower blade 24. The elongated holes 25 are also arranged along the front-rear direction, and each elongated hole 25 has its longitudinal direction along the front-rear direction. Moreover, each elongated hole 25 penetrates the lower blade 24 in the up-down direction. Moreover, the guide member 32 is inserted in each elongated hole 25 to guide reciprocation of the lower blade 24. The length of the guide members 32 in the right-left direction is substantially equal to a length of the elongated hole 25 in the right-left direction. A lower connecting rod 104 is coupled to a rear portion of the lower blade 24. The lower connecting rod 104 is also connected to the crank cam 100. The lower connecting rod 104 will be described later in detail.

The guard 30 is disposed on the guide bar 28. The guard 30 is configured to prevent a relatively large object from contacting the plurality of blade edges 22a of the upper blade 22 and the plurality of blade edges 24a of the lower blade 24. A plurality of guard members 30a is disposed on the guard 30 along the front-rear direction. Left ends of the guard members 30a are positioned leftward of left ends of the blade edges 22a of the upper blade 22 and left ends of the blade edges 24a of the lower blade 24. This can prevent a relatively large object from entering a space between two guard members 30a adjacent in the front-rear direction and contacting the blade edges 22a and 24a.

(Configuration of Body 10)

As shown in FIG. 1, the body 10 includes a body housing 50, a front handle 52, and a rear handle 54.

Figure 2:
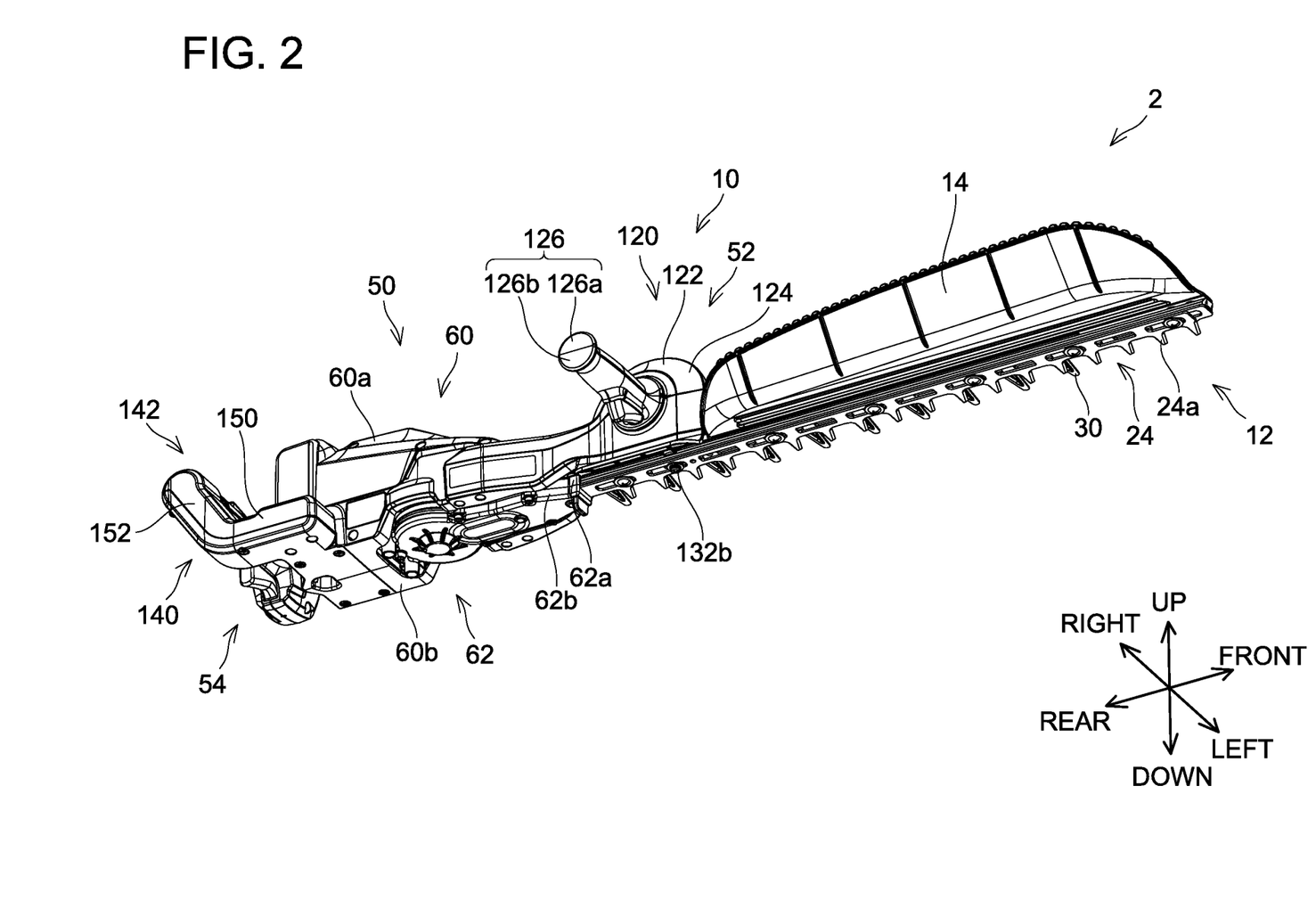
FIG. 2 is a perspective view of the hedge trimmer 2 according to the embodiment when viewed from lower-right-front side.
Figure 4:
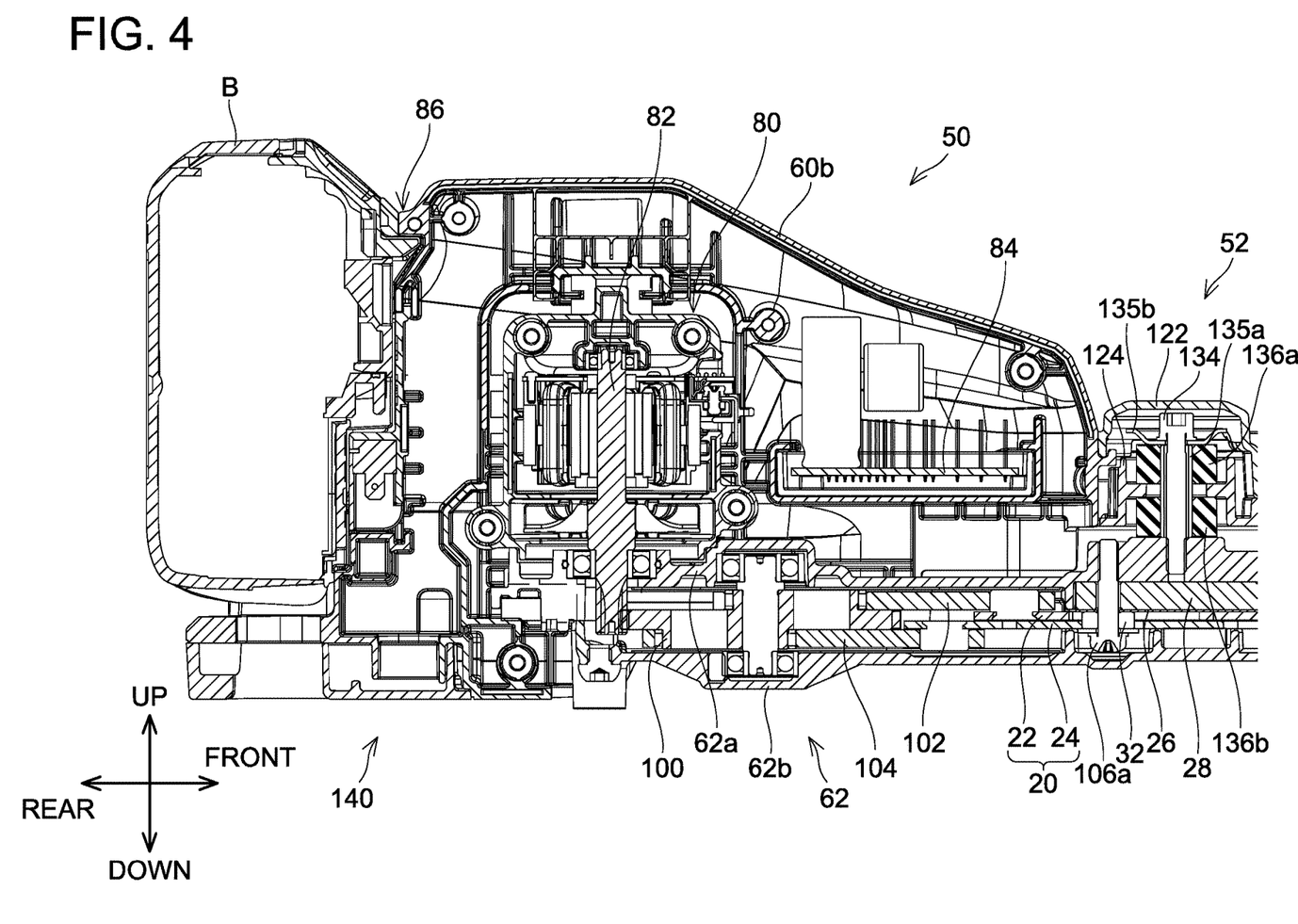
FIG. 4 is a cross-sectional view of a body housing 50 according to the embodiment.
Figure 6:
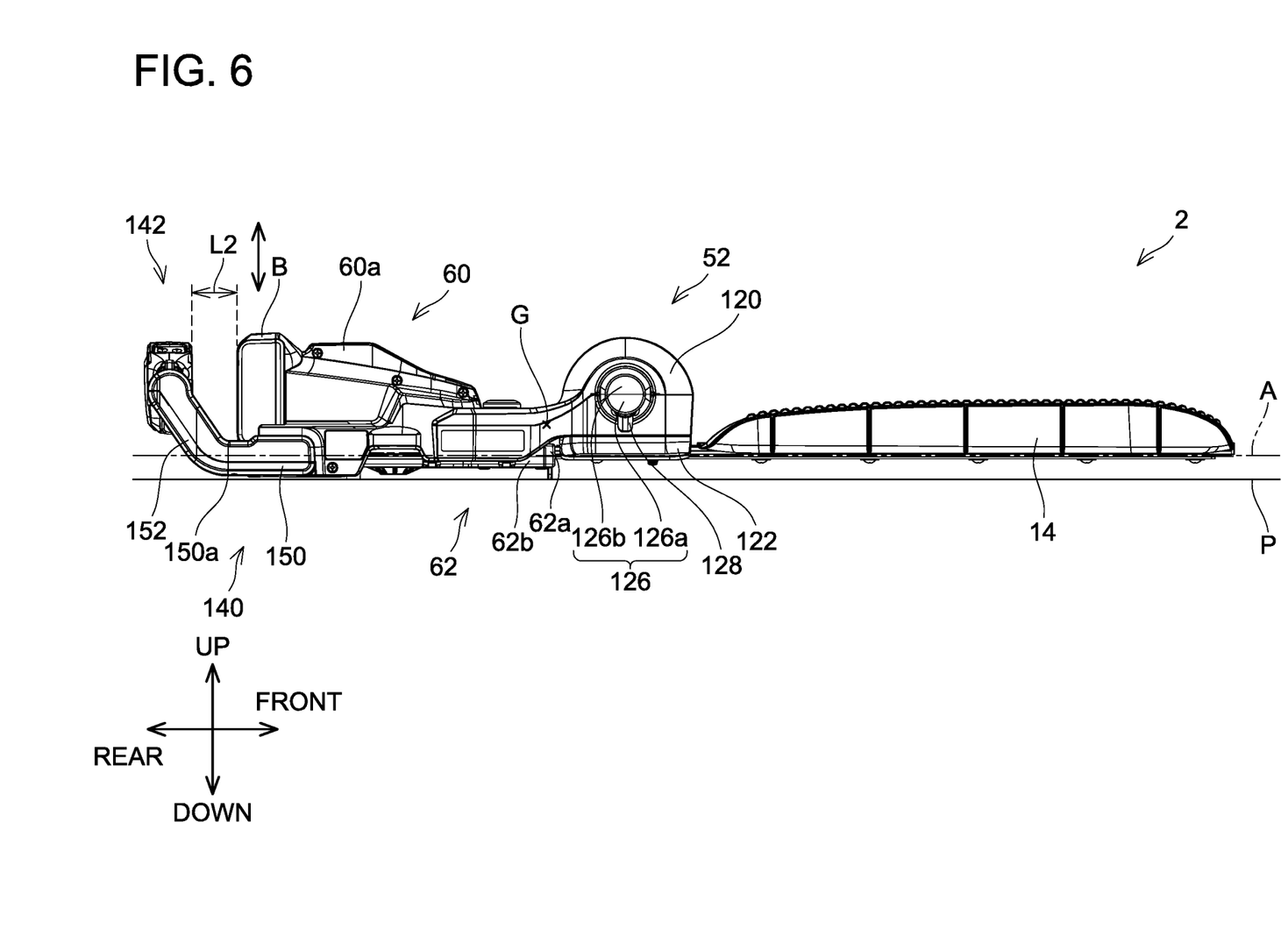
FIG. 6 is a right side view of the hedge trimmer 2 according to the embodiment, which is placed on a placement surface P.

The body housing 50 includes a motor housing 60 and the crank housing 62. As shown in FIG. 2, the crank housing 62 is coupled to a lower portion of the motor housing 60. The motor housing 60 is configured of a right motor housing 60a and a left motor housing 60b. As shown in FIG. 4, the motor housing 60 houses a motor 80 and a controller 84. The motor 80 is, for example, a brushless DC motor. A battery interface 86 is disposed at a rear portion of the motor housing 60. As shown in FIG. 6, a battery B is slid downward with respect to the battery interface 86 to be attached to the battery interface 86, and the battery B attached on the battery interface 86 is slid upward to be detached from the battery interface 86. As shown in FIG. 4, a rear end of the battery B is positioned rearward of a rear end of the motor housing 60. This enables a user to push upward a bottom surface of the battery B attached at the motor housing 60. Therefore, the user can easily detach the battery B from the battery interface 86. The controller 84 is configured to control the motor 80 by controlling electric power supplied from the battery B to the motor 80. The controller 84 is located forward of the motor 80.

As shown in FIG. 2, the crank housing 62 is configured of an upper crank housing 62a and a lower crank housing 62b. As shown in FIG. 4, the crank housing 62 houses the crank cam 100, the upper connecting rod 102, and the lower connecting rod 104. The crank cam 100 is connected to an output shaft 82 of the motor 80. As shown in FIG. 5, the upper blade 22, the lower blade 24, the guide plate 26, and the guide bar 28 of the blade unit 12 are attached to the upper crank housing 62a with bolts 106a and 106b. The guard 30 of the blade unit 12 is not attached to the upper crank housing 62a. Moreover, as described above, the upper connecting rod 102 is coupled to the crank cam 100 and the upper blade 22, and the lower connecting rod 104 is coupled to the crank cam 100 and the lower blade 24. When the motor 80 is driven to rotate, the crank cam 100 rotates. When the crank cam 100 rotates, the upper connecting rod 102 and the lower connecting rod 104 cause the upper blade 22 and the lower blade 24 to reciprocate in the front-rear direction. In the present embodiment, the upper blade 22 and the lower blade 24 are configured to reciprocate in anti-phase. In a variant, only one of the upper blade 22 and the lower blade 24 may be configured to reciprocate.

As shown in FIG. 1, the front handle 52 includes a grip support 120 and a front grip 126. The grip support 120 is configured of an upper support housing 122 and a lower support housing 124. When viewed from the right side, a front portion 122a of the upper support housing 122 has a semi-circular shape that protrudes upward. An upper grip housing 126a is disposed on the upper support housing 122. The upper grip housing 126a extends rightward from the right side surface of the front portion 122a of the upper support housing 122 and has a semi-circular shaped cross section. Moreover, a lower grip housing 126b is disposed on the lower support housing 124. The lower grip housing 126b extends rightward from the right side surface of a front portion 124a of the lower support housing 124 and has a semi-circular shaped cross section. The front grip 126 is configured of the upper grip housing 126a and the lower grip housing 126b. In the present embodiment, the upper support housing 122 and the upper grip housing 126a are integrated with each other, and the lower support housing 124 and the lower grip housing 126b are integrated with each other. A first trigger lever 128 is disposed at the front grip 126. The first trigger lever 128 is connected to a switch mechanism 129 housed in the grip support 120, which is shown in FIG. 5. The switch mechanism 129 is connected to the controller 84 by signal wiring (not shown) that passes through the grip support 120 and the motor housing 60. The front handle 52 is connected to the motor housing 60, so that a path for the signal wiring that passes through the grip support 120 and the motor housing 60 is ensured. When the user grips the front grip 126 and pushes the first trigger lever 128 upward, a signal indicating that the front grip 126 is being gripped is transmitted from the switch mechanism 129 to the controller 84. On the other hand, when the first trigger lever 128 is not pushed upward, the signal indicating that the front grip 126 is being gripped is not transmitted from the switch mechanism 129 to the controller 84. In other words, the switch mechanism 129 is a switch configured to detect whether the front grip 126 is being gripped.

As shown in FIG. 5, the blade unit 12 is attached to a lower portion of the front handle 52 (specifically, the lower support housing 124). The guide plate 26, the guide bar 28, and the guard 30 of the blade unit 12 are attached to a lower front portion of the lower support housing 124 with two externally threaded bolts 132a and 132b, a sleeve 133a that has an inner surface with internal threads corresponding to the external threads of the bolts 132a and 132b, and a washer 133b. Vibration isolator rubbers 130a and 130b are respectively disposed between the upper bolt 132a (specifically, the washer 133b) and the lower support housing 124 and between the lower support housing 124 and the blade unit 12 in the up-down direction. As shown in FIG. 2, the bolt 132b is positioned forward of the front grip 126. Moreover, in the front-rear direction, the bolt 132b is disposed in a range of the lower blade 24 where the plurality of blade edges 24a is disposed. In a variant, in the front-rear direction, the bolt 132b may be disposed in a range of the lower blade 24 where the plurality of blade edges 24a is not disposed, i.e., in the rear portion of the lower blade 24. In other words, in the front-rear direction, the guide plate 26, the guide bar 28, and the guard 30 of the blade unit 12 may be attached to the lower support housing 124 in the range of the lower blade 24 where the plurality of blade edges 24a is not disposed.

As shown in FIG. 5, the blade unit 12 is coupled to a lower rear portion of the lower support housing 124 via the crank housing 62. As described above, the blade unit 12 is attached to the upper crank housing 62a with the bolts 106a and 106b. The upper crank housing 62a and the lower support housing 124 are fixed to each other with a bolt 134, a cylindrical sleeve 135a that has an inner surface with no internal threads, and a washer 135b. Vibration isolator rubbers 136a and 136b are respectively disposed between the bolt 134 (specifically, the washer 135b) and the lower support housing 124 and between the lower support housing 124 and the upper crank housing 62a in the up-down direction. Moreover, the vibration isolator rubbers 136a and 136b are disposed outside the cylindrical sleeve 135a.

As shown in FIGS. 1 and 2, the rear handle 54 includes a rear grip connection 140 and a rear grip unit 142.

Figure 7:
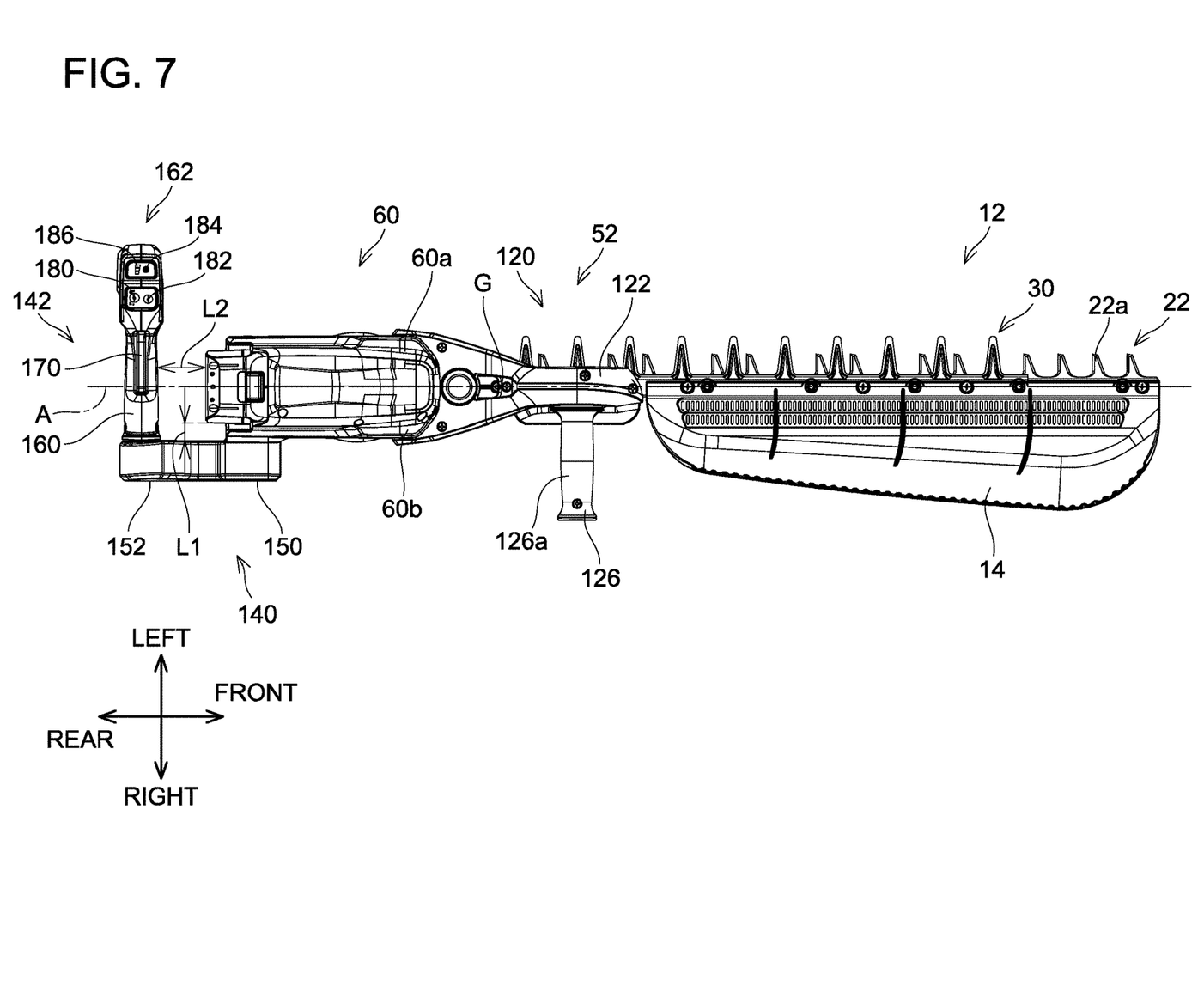
FIG. 7 is a top view of the hedge trimmer 2 according to the embodiment.

The rear grip connection 140 is connected to the lower portion of the motor housing 60. The rear grip connection 140 is configured of a first extension 150 that extends rearward and parallel to a longitudinal axis A of the blade unit 12 (see FIG. 7) on the right side to the motor housing 60 and a second extension 152 that extends rearward and upward from a rear end 150a of the first extension 150. As shown in FIG. 6, the rear end 150a of the first extension 150 is positioned rearward of the rear end of the battery B. As shown in FIG. 7, a rear portion of the second extension 152 is connected to the rear grip unit 142. A space L1 is present between the first extension 150 and the battery B in the right-left direction.

The rear grip unit 142 extends leftward from a rear portion of a left side surface of the second extension 152. The rear grip unit 142 is disposed rearward of the rear end of the battery B. A space L2 is present between the rear grip unit 142 and the battery B in the front-rear direction. The space L2 is large enough to allow the user's hand to pass through.

As shown in FIG. 1, the rear grip unit 142 includes a rear grip 160 and an operation portion 162. A second trigger lever 170 and a drive lever 172 are disposed on the rear grip 160.

When the user pushes the drive lever 172 upward with finger(s) of his/her hand that is gripping the rear grip 160 while the user is pushing the first trigger lever 128 upward by gripping the front grip 126 and pushing the second trigger lever 170 downward by gripping the rear grip 160, electric power is supplied from the battery B to the motor 80 and the motor 80 drives the pair of blades 20. On the other hand, when the user pushes the second trigger lever 170 downward by gripping the rear grip 160 and pushes the drive lever 172 upward with finger(s) of his/her hand that is gripping the rear grip 160 while the user is not gripping the front grip 126, i.e., while the user is not pushing the first trigger lever 128 upward, electric power is not supplied from the battery B to the motor 80. In other words, the motor 80 is not driven and the pair of blades 20 is not driven either. Moreover, when the user pushes the drive lever 172 upward while the user is pushing the first trigger lever 128 upward by gripping the front grip 126 but is not gripping the rear grip 160 (i.e., is not pushing the second trigger lever 170 downward), electric power is not supplied from the battery B to the motor 80. Therefore, while the user is not gripping at least one of the front grip 126 and the rear grip 160, the pair of blades 20 is prevented from being driven.

A power button 180, an untangling button 182, a power light 184, and a speed display 186 are disposed at the operation portion 162. A right portion of a surface of the operation portion 162 where the power button 180 and the untangling button 182 are disposed is tilted downward. Positions of the power button 180 and the untangling button 182 are within a reach of the thumb of user's hand that grips the rear grip 160. Therefore, the user can operate the power button 180 and the untangling button 182 while gripping the rear grip 160.

The power button 180 is a button for switching on/off of a power source of the hedge trimmer 2 and is also a button for changing a rotational speed of the motor 80. When the user long-presses the power button 180, the controller 84 is thereby activated, and when the user long-presses the power button 180 again, the controller 84 is shut down. While the controller 84 is activated, the power light 184 is on. When the user short-presses the power button 180 while the controller 84 is activated, a target rotational speed of the motor 80 is changed. In the present embodiment, the motor 80 is configured to be operable at three speed levels, "high speed", "medium speed", and "low speed". Each time the power button 180 is operated, the target rotational speed of the motor 80 is changed in the order of the low speed, the medium speed, the high speed, the low speed, and so forth. The speed display 186 is configured to display the current target rotational speed of the motor 80. The speed display 186 also functions as a display for notifying the user that the motor 80 has stopped because of high temperature in the battery B, that the motor 80 has stopped because of insufficiency in power of the battery B, and the like.

The untangling button 182 is used when branches or the like get tangled between the blade edges 22a of the upper blade 22 and the blade edges 24a of the lower blade 24. When the untangling button 182 is operated, the motor 80 reverse-rotates by a predetermined number of rotations (e.g., by ¼ turn). Branches or the like can get tangled between the upper blade 22 and the lower blade 24 when the blade edges 22a of the upper blade 22 and the blade edges 24a of the lower blade 24 approach each other. When the untangling button 182 is operated and the motor 80 thereby reverse-rotates while branches or the like are tangled between the blade edges 22a of the upper blade 22 and the blade edges 24a of the lower blade 24, the blades 20 move to bring the blade edges 22a of the upper blade 22 and the blade edges 24a of the lower blade 24 apart from each other. This can remove the branches or the like tangled between the blade edges 22a of the upper blade 22 and the blade edges 24a of the lower blade 24.

As shown in FIG. 7, in the hedge trimmer 2 of the present embodiment, the battery B, which is a heavy object, is attached to the battery interface 86 disposed at the rear portion of the motor housing 60. In this configuration, a center of gravity G of the hedge trimmer 2 with the battery B attached thereto is positioned rearward of the front grip 126 and forward of the rear grip 160. A pair of blades that are different in length of their blade edge portions may be attached to the hedge trimmer 2. The present embodiment assumes attachment of a pair of blades whose blade edge portions have lengths of 500 mm to 750 mm. In the hedge trimmer 2 of the present embodiment, a layout for the battery B, the motor 80, and the like is designed to allow the center of gravity G of the hedge trimmer 2 to be positioned rearward of the front grip 126 and forward of the rear grip 160 even when the pair of blades whose blade edge portions have lengths of 500 mm to 750 mm is attached.

In one or more embodiments, as shown in FIGS. 1 to 5, the hedge trimmer 2 comprises: the body housing 50; the pair of blades 20 extending forward from the front portion of the body housing 50; the motor 80 housed in the body housing 50 and configured to drive the pair of blades 20; the front handle 52 disposed forward of the body housing 50 and comprising the grip support 120 and the front grip 126, wherein the pair of blades 20 is attached to the grip support 120 and the front grip 126 is connected to the grip support 120; and the rear handle 54 connected to the rear portion of the body housing 50 and comprising the rear grip 160. As shown in FIG. 5, the vibration isolator rubbers 130a and 130b are disposed between the grip support 120 and the pair of blades 20. In this configuration, the vibration isolator rubbers 130a and 130b, which are disposed between the grip support 120 and the pair of blades 20, absorb vibrations caused by the pair of blades 20 being driven. This reduces transmission of the vibrations caused by the pair of blades 20 being driven to the grip support 120. Therefore, vibrations transmitted from the grip support 120 to the front grip 126 can further be reduced.

In one or more embodiments, as shown in FIGS. 4 and 5, the grip support 120 is connected to the front portion of the body housing 50, and the vibration isolator rubbers 136a and 136b are disposed between the body housing 50 and the grip support 120. In this configuration, the vibration isolator rubbers 136a and 136b, which are disposed between the body housing 50 and the grip support 120, reduces transmission of vibrations, which were transmitted from the pair of blades 20 to the body housing 50, to the grip support 120.

In one or more embodiments, the front grip 126 is integrated with the grip support 120. This configuration facilitates formation of the front handle 52 as compared with a configuration where the front grip 126 and the grip support 120 are separate parts. Moreover, this configuration reduces the number of components of the hedge trimmer 2.

In one or more embodiments, the pair of blades 20 is driven by the motor 80. This configuration decreases vibrations caused by the pair of blades 20 being driven as compared with a configuration where the pair of blades 20 is driven by an engine. Therefore, vibrations transmitted from the body housing 50 to the grip support 120 can be reduced.

In one or more embodiments, as shown in FIGS. 1 to 7, the hedge trimmer 2 comprises: the body housing 50; the pair of blades extending forward from the front portion of the body housing 50; the motor 80 housed in the body housing 50 and configured to drive the pair of blades 20; the front grip 126 connected to the body housing 50; the rear grip connection 140 connected to the body housing 50 and disposed rearward of the front grip 126; and the battery B detachably attached by sliding the battery B with respect to the body housing 50 when the hedge trimmer 2 is placed on the placement surface P. As shown in FIG. 6, the sliding direction of the battery B with respect to the body housing 50 is orthogonal to the longitudinal axis A of the pair of blades 20 when the hedge trimmer 2 is placed on the placement surface P. This configuration enables the user to detach and attach the battery B from above. Thus, this configuration facilitates detachment and attachment of the battery B as compared with a configuration where the battery B is detached and attached from a lateral side. Therefore, the user can easily detach and attach the battery B.

In one or more embodiments, as shown in FIG. 7, the battery B is attached between the body housing 50 and the rear grip 160, and the space L2 is present between the rear grip 160 and the battery B. This configuration enables the user to slip his/her finger(s) into the space L2 between the rear grip 160 and the battery B to push upward the bottom surface of the battery B attached to the body housing 50. Therefore, the user can easily detach the battery B from the body housing 50.

In one or more embodiments, as shown in FIG. 7, the center of gravity G of the hedge trimmer 2 with the battery B attached to the body housing 50 is positioned rearward of the front grip 126 and forward of the rear grip 160. This configuration enables the user to easily control tilting of the hedge trimmer 2 in the front-rear direction while he/she is gripping the hedge trimmer 2. Therefore, operability of the hedge trimmer 2 can be improved.

(Correspondence Relationships)

The pair of blades 20 is an example of "blade". The motor 80 is an example of "prime mover". The vibration isolator rubbers 130a and 130b are examples of "first vibration isolator". The vibration isolator rubbers 136a and 136b are examples of "second vibration isolator".

While specific examples of the present disclosure have been described above in detail, these examples are merely illustrative and place no limitation on the scope of the patent claims. The technology described in the patent claims also encompasses various changes and modifications to the specific examples described above.

(First Variant) The vibration isolator rubbers 136a and 136b may not be disposed between the body housing 50 and the grip support 120.

(Second Variant) The grip support 120 and the front grip 126 may be formed separately.

(Third Variant) The "prime mover" is not limited to the motor 80 and may be an engine or the like.

(Fourth Variant) The sliding direction of the battery B may form 45 degrees or more upward to the longitudinal axis A of the blade unit 12.

(Fifth Variant) The battery B may be attached to the right side surface, the left side surface, or the like of the motor housing 60.

(Sixth Variant) The number of the batteries B attachable to the motor housing 60 is not limited to one and may be two or more.

(Seventh Variant) The center of gravity G of the hedge trimmer 2 may be positioned forward of the front grip 126.

The technical elements explained in the present description or drawings provide technical utility either independently or through various combinations. The present invention is not limited to the combinations described at the time the claims are filed. Further, the purpose of the examples illustrated by the present description or drawings is to satisfy multiple objectives simultaneously, and satisfying any one of those objectives gives technical utility to the present invention.

What is claimed is:

1. A hedge trimmer comprising:
   a body housing;
   a blade extending forward from a front portion of the body housing, wherein the blade has a longitudinal axis which extends in a front-rear direction of the hedge trimmer;
   a prime mover housed in the body housing and configured to drive the blade;
   a front handle disposed forward of the body housing in the front-rear direction and comprising a grip support and a front grip that is connected to the grip support, wherein the blade is attached to the grip support and the front grip is connected to the grip support; and
   a rear handle connected to a rear portion of the body housing in the front-rear direction and comprising a rear grip,
   wherein
   the blade comprises a plurality of blade edges disposed along the front-rear direction,
   the plurality of blade edges includes a frontmost blade edge that is disposed on a front most side among the plurality of blade edges and a rearmost blade edge that is disposed on a rear most side among the plurality of blade edges,
   a first vibration isolator is disposed between the frontmost blade edge and the rearmost blade edge in the front-rear direction, and
   the first vibration isolator is disposed between the grip support and the blade in an up-down direction, as viewed from the front-rear direction and as viewed from a right-left direction of the hedge trimmer, wherein the right-left direction is perpendicular to the front-rear direction.

2. The hedge trimmer according to claim 1, wherein the grip support is connected to the front portion of the body housing, and
   a second vibration isolator is disposed between the body housing and the grip support.

3. The hedge trimmer according to claim 1, wherein the front grip and the grip support are integrated with each other.

4. The hedge trimmer according to claim 1, wherein the prime mover is a motor configured to be driven by electric power.

5. The hedge trimmer according to claim 1, wherein the prime mover is a motor driven by electric power,
   the hedge trimmer further comprises:
   a battery detachably attached to the body housing by sliding the battery with respect to the body housing when the hedge trimmer is placed on a placement surface, and
   a sliding direction of the battery with respect to the body housing forms 45 degrees or more upward to the longitudinal axis of the blade when the hedge trimmer is placed on the placement surface.

6. The hedge trimmer according to claim 5, wherein the sliding direction is substantially orthogonal to the longitudinal axis of the blade.

7. The hedge trimmer according to claim 5, wherein
the battery is attached between the body housing and the rear grip, and
a space is present between the rear grip and the battery.

8. The hedge trimmer according to claim 5, wherein a center of gravity of the hedge trimmer with the battery attached to the body housing is positioned rearward of the front grip and forward of the rear grip.

9. The hedge trimmer according to claim 1, wherein the blade is attached to the lower support housing with a bolt, and the bolt passes through the first vibration isolator.

10. A hedge trimmer comprising:
a body housing;
a blade extending forward from a front portion of the body housing, wherein the blade has a longitudinal axis which extends in a front-rear direction of the hedge trimmer;
a motor housed in the body housing and configured to drive the blade;
a front grip connected to the body housing;
a rear grip connected to the body housing and disposed rearward of the front grip; and
a battery disposed between the body housing and the rear grip, wherein a rear surface of the battery is exposed and faces the rear grip, wherein the battery is detachably attached to a rear portion of the body housing by sliding the battery with respect to the body housing when the hedge trimmer is placed on a placement surface,
wherein
a sliding direction of the battery with respect to the body housing forms 45 degrees or more upward to the longitudinal axis of the blade when the hedge trimmer is placed on the placement surface,
a space is defined between the rear grip and the exposed rear surface of the battery,
the space defined between the rear grip and the exposed rear surface of the battery is large enough to allow a user's hand to pass through a plane and into the space when the hedge trimmer is placed on the placement surface, wherein the plane extends parallel to the front-rear direction so as to pass through an uppermost portion of the battery and an uppermost portion of the rear grip.

11. The hedge trimmer according to claim 10, wherein the sliding direction is substantially orthogonal to the longitudinal axis of the blade.

12. The hedge trimmer according to claim 10, wherein a center of gravity of the hedge trimmer with the battery attached to the body housing is positioned rearward of the front grip and forward of the rear grip.

* * * * *